(12) United States Patent
Roth

(10) Patent No.: US 7,037,544 B2
(45) Date of Patent: *May 2, 2006

(54) METHOD FOR REDUCING MICROBE CONTENT IN FOODSTUFFS BY PH AND PHYSICAL MANIPULATION

(75) Inventor: Eldon Roth, Dakota Dunes, SD (US)

(73) Assignee: Freezing Machines, Inc., Dakota Dunes, SD (US)

( * ) Notice: Subject to any disclaimer, the term of this patent is extended or adjusted under 35 U.S.C. 154(b) by 13 days.

This patent is subject to a terminal disclaimer.

(21) Appl. No.: 10/779,032

(22) Filed: Feb. 13, 2004

(65) Prior Publication Data

US 2004/0161506 A1    Aug. 19, 2004

Related U.S. Application Data

(60) Continuation of application No. 09/875,702, filed on Jun. 6, 2001, now Pat. No. 6,692,785, which is a division of application No. 09/213,190, filed on Dec. 17, 1998, now Pat. No. 6,389,838, which is a continuation-in-part of application No. 09/144,928, filed on Sep. 1, 1998, now Pat. No. 6,054,164.

(51) Int. Cl.
*A23B 4/08* (2006.01)
*A23L 1/317* (2006.01)
*A23L 3/36* (2006.01)

(52) U.S. Cl. ............... 426/319; 426/327; 426/513; 426/518; 426/519; 426/524; 426/646

(58) Field of Classification Search ............... 426/319, 426/327, 513, 518, 519, 524, 641, 646; 62/32, 62/62, 341

See application file for complete search history.

(56) References Cited

U.S. PATENT DOCUMENTS

| 3,023,109 A | 2/1962 | Hines |
| 3,119,696 A | 1/1964 | Williams |
| 3,122,748 A | 2/1964 | Beebe, Jr. |
| 3,728,136 A | 4/1973 | Langlands |
| 4,036,997 A | 7/1977 | VerBurg |
| 4,072,763 A | 2/1978 | Mart |
| 4,192,899 A | 3/1980 | Roth |

(Continued)

FOREIGN PATENT DOCUMENTS

GB        1223159        6/1967

(Continued)

OTHER PUBLICATIONS

Goodfellow, S.J., Bordeaux, F.M., Masters, B.A., Brown, W.L. and Johnston, M.R. "How to Cope with Product Exposure to Ammonia," 32-33, 1978.

(Continued)

*Primary Examiner*—Arthur L. Corbin
(74) *Attorney, Agent, or Firm*—Russell D. Culbertson; The Culbertson Group, P.C.

(57) ABSTRACT

A manipulating apparatus (10) receives a plurality of previously frozen pieces of pH modified foodstuffs or workpieces (23) and physically manipulates or stresses the workpieces while they remain in a frozen state. The physical manipulation causes relative movement between various points within the volume of the workpieces (23) and kills microbes within the foodstuff. One preferred pH modifying arrangement includes a supply of $NH_3$ gas (11) and a pump (9) for placing the comminuted foodstuffs to be processed and the $NH_3$ gas together under an operating pressure for a period of time sufficient to increase the pH of the foodstuffs.

20 Claims, 5 Drawing Sheets

U.S. PATENT DOCUMENTS

| | | | |
|---|---|---|---|
| 4,210,677 | A | 7/1980 | Huffman |
| 4,258,068 | A | 3/1981 | Huffman |
| 4,474,823 | A | 10/1984 | Nishikawa et al. |
| 4,594,253 | A | 6/1986 | Fradin |
| 4,783,290 | A | 11/1988 | Simelunas |
| 4,919,955 | A | 4/1990 | Mitchell |
| 5,871,795 | A | 2/1999 | Roth |
| 6,387,426 | B1 | 5/2002 | Roth |

FOREIGN PATENT DOCUMENTS

| | | | |
|---|---|---|---|
| JP | 58047429 | A | 3/1983 |
| JP | 64-39965 | | 2/1989 |
| JP | 03004737 | A | 1/1991 |
| SU | 2081186/13 | | 12/1974 |
| WO | WO 93/17562 | | 9/1993 |

OTHER PUBLICATIONS

Jay, J.M., "Sources, Types, Incidence, and Behavior of Micro-organisms in Food." Modern Food Microbiology, 3rd Ed., Ch. 3, 52-56; Ch. 4, 71-72, 1986.

Eckhoff, S.R., Tuite, J.F., Foster, G.H., Kirleis, A.W., and Okos, M.R., "Microbial Growth Inhibition by SO2 or SO2 plus NH3 Treatments During Slow Drying of Corn." Cereal Chemistry, 60(3); 185-188, 1983.

METHOD FOR REDUCING MICROBE CONTENT IN FOODSTUFFS BY PH AND PHYSICAL MANIPULATION

CROSS-REFERENCE TO RELATED APPLICATIONS

This application is a continuation of U.S. patent application Ser. No. 09/875,702, filed Jun. 6, 2001, and entitled METHOD FOR REDUCING MICROBE CONTENT IN FOODSTUFFS BY pH AND PHYSICAL MANIPULATION now U.S. Pat. No. 6,692,785, which is a divisional of U.S. patent application Ser. No. 09/213,190, filed Dec. 17, 1998, and entitled APPARATUS AND METHOD FOR REDUCING MICROBE CONTENT IN FOODSTUFFS BY pH AND PHYSICAL MANIPULATION now U.S. Pat. No. 6,389,838 B1, which is a continuation-in-part of U.S. patent application Ser. No. 09/144,928, filed Sep. 1, 1998, and entitled APPARATUS AND METHOD FOR MANIPULATING FOODSTUFFS TO REDUCE MICROBE CONTENT, now U.S. Pat. No. 6,054,164. The Applicant hereby claims the benefit of each of these patent applications under 35 U.S.C. §120. The entire content of each of these patent applications is incorporated herein by this reference.

TECHNICAL FIELD OF THE INVENTION

This invention relates to food processing, and more particularly, to reducing microbe content in processed foodstuffs. The invention encompasses a method for manipulating the pH of foodstuffs and then physically manipulating the foodstuffs to reduce microbe content.

BACKGROUND OF THE INVENTION

Most foods are processed in some way before reaching the consumer. For example, vegetables may be washed, trimmed, blanched, and than frozen prior to distribution. Meat products also require significant processing before reaching the consumer. At the very least, the animal carcass is cut into segments and the larger cuts of meat or fillets are cut from these initial segments. Other usable elements remaining after separating the larger cuts of meat are then separated from the remaining unusable elements such as bone and then ground or chopped, mixed, and then commonly frozen for distribution.

Foodstuffs are inevitably exposed to microbes as the foodstuffs are processed or handled. Microbes are part of the natural decay process of organic material and may be deposited on foodstuffs through the air or by contact between the foodstuff and contaminated equipment or other material. Although some microbes may be relatively benign, others contribute to spoilage and some can cause serious illness. Lactic acid producing bacteria are examples of benign microbes, while some strains of *E. Coli, Salmonella, Listeria*, and Staph bacteria are examples of pathogenic microbes which can cause serious illness when ingested by humans.

Even with careful processing practices, foodstuffs may be exposed to pathogenic microbes during processing or initial handling. The risk of illness from dangerous microbes which may be present in foodstuffs is reduced by a careful handling and cooking of the foodstuffs by the consumer. In larger cuts of meat for example, dangerous microbes may only be present on the surface of the meat and are readily killed in the cooking process.

Ground or chopped and mixed foodstuffs, including ground beef, may carry dangerous microbes which are killed only after thoroughly cooking the material. The reason for this is that dangerous microbes residing at the surface of a larger piece of the foodstuff may be distributed throughout the final ground or chopped product as the large piece is ground and mixed together with other pieces. Thorough cooking is required in order to kill microbes residing in the center of a piece of ground and mixed foodstuff.

It is desirable to control the growth of microbes and reduce microbe content in foodstuffs. Microbe content and growth in foodstuffs may be reduced by applying chemical additives or preservatives to the foodstuff. These chemical additives or preservatives, however, may not be acceptable to consumers, or may have undesirable effects on foodstuffs.

Alternatively to chemical additives or preservatives, heat may be used to kill microbes in foodstuffs. However, heat processing or sterilization often has undesirable effects on the quality or characteristics of the foodstuff and may make the food product undesirable to the consumer.

SUMMARY OF THE INVENTION

It is an object of the invention to provide a method for reducing microbe content in comminuted foodstuffs, particularly comminuted meats.

The method of the invention comprises modifying the pH of a foodstuff and then physically manipulating or applying stress to the foodstuff while the foodstuff is in a frozen state. The physical manipulation produces significant relative movement within the foodstuff. In this sense "relative movement" means movement between one point in the foodstuff and adjacent points in the foodstuff. While the mechanism by which the process reduces live microbe count is not fully understood, pH modification followed by physical manipulation according to invention has been shown to significantly reduce microbe content in the treated foodstuffs.

The process according to the invention may be performed as a continuous process or as a batch process. In either case, the pH of the foodstuff to be processed is first modified by suitable means. Preferably after the pH modification, the foodstuff is cooled by a suitable freezer to a process temperature no greater than or below the freezing point of the foodstuff to place the foodstuff in a frozen state. As used in this disclosure and the accompanying claims, the "freezing point of the foodstuff" means the temperature at which ice crystals begin to form in the foodstuff to be processed. The frozen foodstuff is then formed into workpieces. A manipulating arrangement manipulates the frozen workpieces to produce relative movement preferably throughout each workpiece. The manipulating arrangement may define a working area and operate to manipulate each workpiece as it passes or is drawn through the working area.

The pH of the foodstuff may be modified in any suitable manner. For example, a higher pH foodstuff such as lean finely textured beef may be mixed with a regular ground beef to modify the pH of the resulting mixture. The process of producing lean finely textured beef, which increases pH with respect to the starting material, also represents a suitable pH modifying step. Also, a foodstuff may be placed in contact with $NH_3$ (Ammonia) in gaseous or aqueous form to increase the pH of the foodstuff. U.S. patent application Ser. No. 08/803,322, now U.S. Pat. No. 5,871,795, the disclosure of which is hereby incorporated herein by this reference, discloses a pH modifying apparatus and method which may be employed in this invention. pH modification within the scope of the invention also encompasses decreasing pH. The pH of a foodstuff may be decreased by placing the foodstuff in contact with a pH reducing material such as $CO_2$, for example.

In one form of the invention, the manipulating arrangement comprises first and second spaced apart rollers, with the working area defined between the first and second rollers. The rollers are preferably driven in a counter-rotating fashion to draw a workpiece there between. The spacing between the first and second rollers is smaller than an initial thickness of each workpiece so that each frozen workpiece is compressed and allowed to spread out laterally as it passes between the rollers.

Each roller may include a plurality of the spaced apart longitudinal ridges. The ridged rollers may be rotated such that each ridge on one roller registers with the space between a pair of adjacent ridges on the opposite roller as the rollers are rotated, similar to the cogs of two intermeshed gears. However, the ridges preferably do not touch, but maintain a minimum clearance. This ridged roller form of manipulating arrangement has the advantage that the frozen workpiece not only spreads out laterally as it is drawn between the rollers but is also bent between the opposing ridges on the counter-rotating rollers.

Another form of manipulating arrangement within the scope of the invention comprises two opposing plates with a suitable actuator, or actuators, for pressing the opposing plates together. The process includes placing a plurality of workpieces between the two plates and then operating the actuator arrangement to press the plates together to significantly reduce the volume between the plates. The relative movement of the plates presses the previously frozen workpieces into a block of frozen material. In this arrangement, the desired relative movement in the workpieces occurs as the workpieces deform to fill the voids left between adjacent workpieces when the workpieces were initially placed in the area between the opposing plates.

Regardless of the particular manipulating arrangement employed to manipulate the frozen workpieces according to the invention, a manipulator temperature control system preferably controls the temperature of the manipulating arrangement surfaces which come in contact with the frozen workpieces. The manipulator temperature control system may cool the surfaces of the manipulating arrangement to ensure that heat from the surfaces of the manipulating arrangement does not raise the temperature of the workpieces to a temperature above the desired process temperature. Alternatively, the manipulator temperature control system may heat the manipulating arrangement surfaces and thereby heat the frozen workpieces from a lower process temperature to the freezing temperature or even slightly above the freezing temperature. Also, maintaining the surfaces of the manipulating arrangement at a temperature near the process temperature or slightly above the process temperature also helps prevent the workpieces from sticking to the manipulator surfaces.

These and other objects, advantages, and features of the invention will be apparent from the following description of the preferred embodiments, considered along with the accompanying drawings.

DESCRIPTION OF THE PREFERRED EMBODIMENTS

Figure 1:
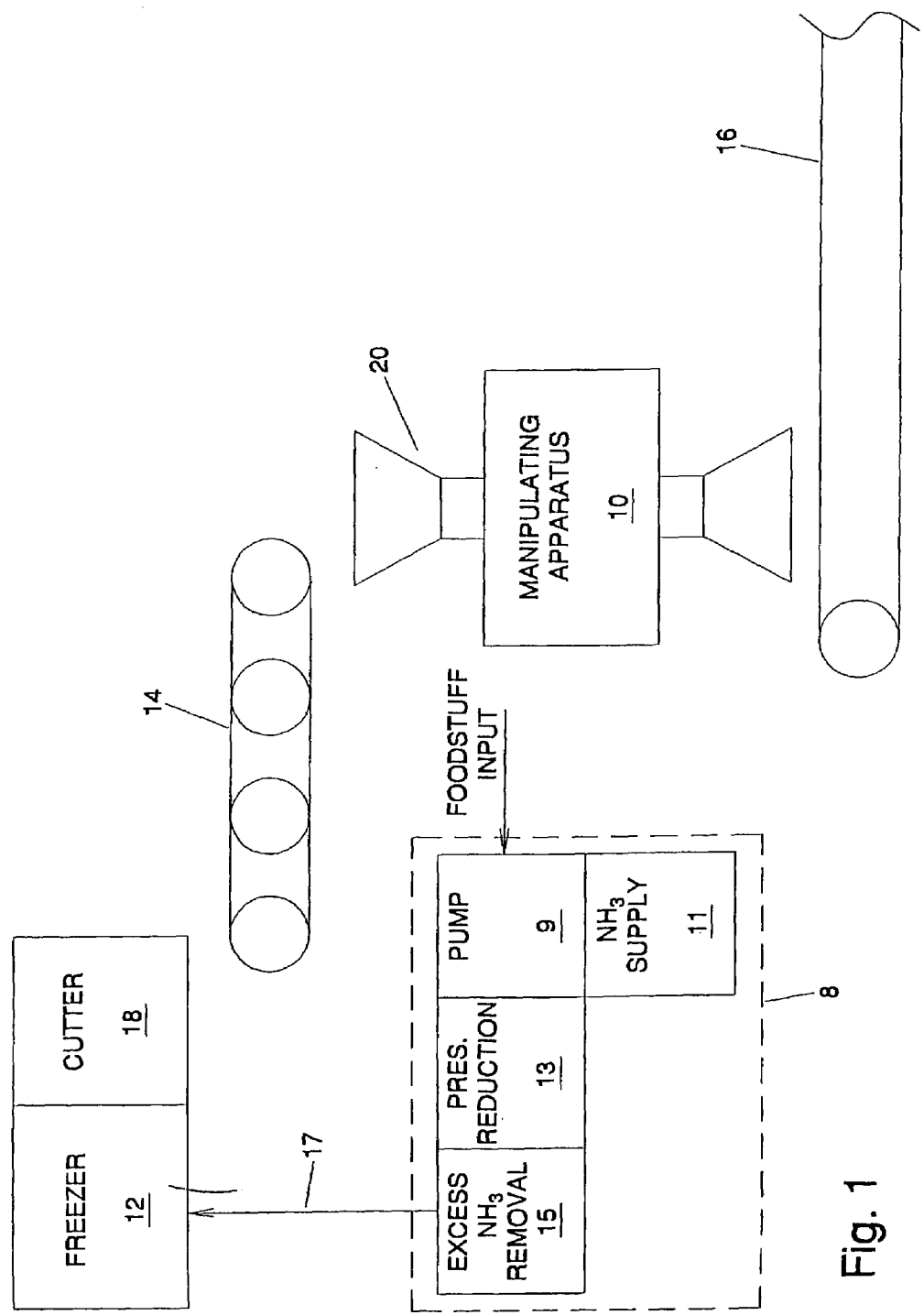
FIG. 1 is a diagrammatic representation of a foodstuff pH and physical manipulation system embodying the principles of the invention.

Referring to FIG. 1, an apparatus 10 for manipulating foodstuffs is associated with a pH manipulating system 8 and a suitable freezer 12. A transport device 14 is positioned between the freezer 12 and manipulating apparatus 10. A second transport device 16 may be positioned at an outlet from the manipulating apparatus 10 for transporting treated foodstuffs to further processing equipment.

The illustrated pH manipulating system 8 includes a pump 9, $NH_3$ supply 11, pressure reduction arrangement 13, and a system 15 for removing excess $NH_3$. Conduit 17 transfers pH modified foodstuff to freezer 12. Pump 9 preferably comprises a piston pump with an injection arrangement (not shown) for injecting a measured amount of $NH_3$ from supply 11 into the foodstuff stream either during compression or prior to compression. The pump preferably compresses the $NH_3$ and foodstuff to a pressure at or above the vapor pressure of the $NH_3$ at the temperature of the foodstuff. As disclosed in U.S. patent application Ser. No. 08/803,322, now U.S. Pat. No. 5,871,795, this treatment pressure has been found to rapidly increase the pH of foodstuffs. Pressure reduction arrangement 13 may comprise any suitable device or arrangement for releasing the pressure developed by pump 9. System 15 may comprise an arrangement for applying a vacuum or any other arrangement for drawing off excess $NH_3$ after the treatment pressure is released at device 13.

Those skilled in the art will appreciate that many arrangements other than the system 8 shown in FIG. 1 may be used to modify the pH of the foodstuff. For example, the foodstuff may be treated in batches in a vessel into which a suitable pH modifying gas is introduced. Also, a liquid material such as aqueous $NH_3$ may be applied to the foodstuff under pressure or otherwise. Any pH modifying material may be used to modify the pH of the foodstuff within the scope of the invention. Although the invention preferably comprises increasing the pH of the foodstuff, pH modification within the scope of the invention also encompasses decreasing the pH of the foodstuff. Decreasing the pH may be accomplished by applying a pH decreasing material, such as $CO_2$ gas, to the foodstuff preferably under pressure as described above with reference to FIG. 1. Furthermore, no pH modifying material may be needed for processing certain foodstuffs. For example, reducing the fat content of a comminuted beef product may change the pH of the material sufficiently within the scope of the invention, as may mixing a reduced fat product with a regular comminuted product.

The pH modification required according to the invention may be minimal. However, the pH modification step according to the invention preferably comprises modifying the pH of the foodstuff by at least approximately 3% from the original pH of the foodstuff. For example, a foodstuff having an original pH of approximately 5.5 is preferably treated to increase its pH to at least approximately 5.67. Treatment times to modify the pH may range from on the order of approximately one second to three minutes or more.

Freezer 12 freezes the pH modified foodstuff and cutter 18 cuts the frozen foodstuff into workpieces which are then placed on transport device 14. Transport device 14 transports the workpieces to manipulating apparatus 10. Manipulating apparatus 10 physically manipulates the frozen foodstuff to produce relative movement between different points in the volume of the foodstuff. This relative movement occurs preferably throughout the entire volume of the foodstuff during the treatment process. It is believed that the relative movement caused by manipulating apparatus 10 damages the cell walls of microbes in the foodstuff, thereby killing the microbes. This damage to the microbes may be accomplished as ice crystals are pressed against the microbe cell walls in the course of the manipulation. The microbes may also become brittle at the processing temperature employed by the invention and the manipulation may serve to damage the cell walls in this relatively brittle state. Although the mechanism by which microbe kill is accomplished is not fully understood, tests of the apparatus and process according to the invention indicate significant microbe kill.

The freezer 12 may be any suitable device capable of cooling the foodstuff to a process temperature no greater than or below the freezing point of the foodstuff. For example, freezer 12 may comprise a roller-type freezer as disclosed in U.S. Pat. Nos. 4,138,768 and 4,192,899, which are incorporated herein by this reference. Regardless of the particular type of freezer employed, freezer 12 preferably freezes the foodstuff in less than thirty (30) minutes and optimally in less than about ten (10) minutes. The roller-type freezer disclosed in U.S. Pat. Nos. 4,138,768 and 4,192,899 is particularly well-suited for rapidly freezing foodstuffs into thin sheets of material which may then be cut into small sections. Freezing times of approximately 2 minutes may be obtained using these roller-type freezers. Regardless of the freezer type, rapid freezing is preferable for purposes of this invention because rapid freezing produces relatively smaller ice crystals as compared to a slow freezing process. It is believed that the smaller ice crystals produced by rapidly freezing a foodstuff improve microbe kill during the manipulation or stressing step according to the invention.

Freezer 12 also preferably has associated with it a forming arrangement for forming the pH modified foodstuff into workpieces comprising discrete pieces of foodstuff. The forming arrangement may comprise the cutting system 18 such as the cutting system shown in U.S. Pat. No. 4,192,899. This cutting arrangement 18 cuts workpieces from the sheet of frozen foodstuff produced by freezer 12. Alternatively, the foodstuff may be formed into workpieces in an unfrozen state and then frozen to the process temperature. In any event, the workpieces preferably comprise approximately half-inch by half-inch squares having a thickness of approximately 0.25 to 0.125 inches. Although larger workpieces may be used within the scope of invention, the thickness of workpieces is preferably less than 0.75 inches. The thinness of the workpiece helps ensure relative movement throughout the volume of the workpiece as the workpiece is manipulated according to the invention. Also, thin sheets or workpieces of foodstuff may be cooled more quickly to the process temperature.

Transport device 14 preferably comprises a vibrating conveyor capable of receiving the frozen workpieces from freezer 12 and cutter system 18, and transporting the workpieces to an inlet 20 associated with manipulating apparatus 10. Details of the transport device 14 are not shown in the figures since a number of different types of conveying devices may be employed within the scope of the invention, and in any event the details of such conveying devices are well within the knowledge of those skilled in the present field. Transport device 14 preferably moves the frozen workpieces quickly to the manipulating device 10 so that the workpieces are manipulated as quickly as possible after being frozen to the process temperature. It is believed that microbes which have been maintained at the process temperature for a long period of time can survive the manipulation better. In the preferred form of the invention, manipulating device 10, freezer 12, and transport device 14 are situated and operated such that the workpieces are manipulated according to the invention as quickly as possible after reaching the process temperature, and preferably no more than about ten (10) minutes, about thirty (30) minutes, or about one hour, or as much as 24 hours, after the workpieces reach the process temperature, although longer periods may be used within the scope of the invention.

Figure 2:
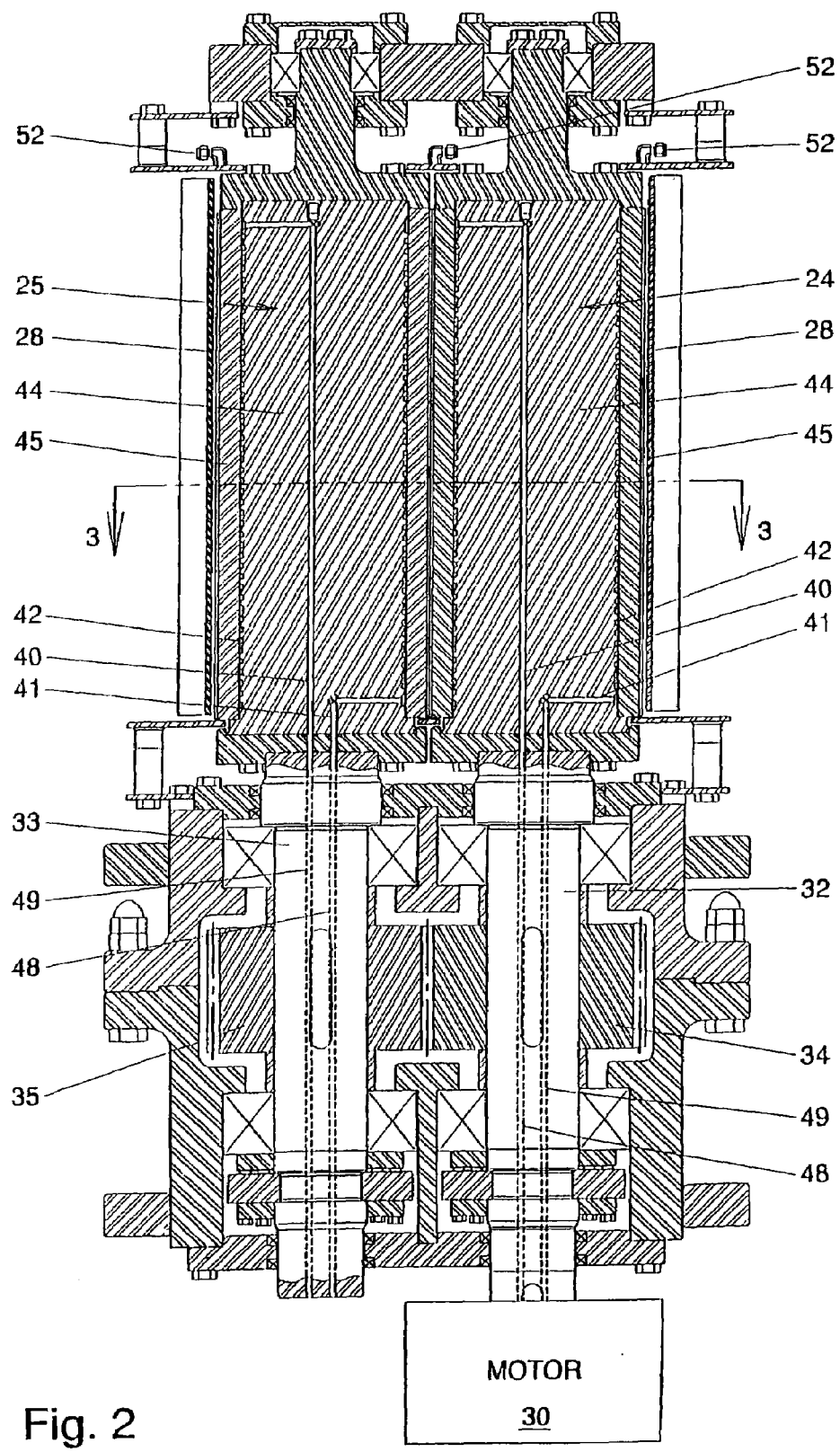
FIG. 2 is a partial longitudinal section view of a manipulating arrangement suitable for use as the manipulating arrangement shown diagrammatically in FIG. 1.
Figure 3:
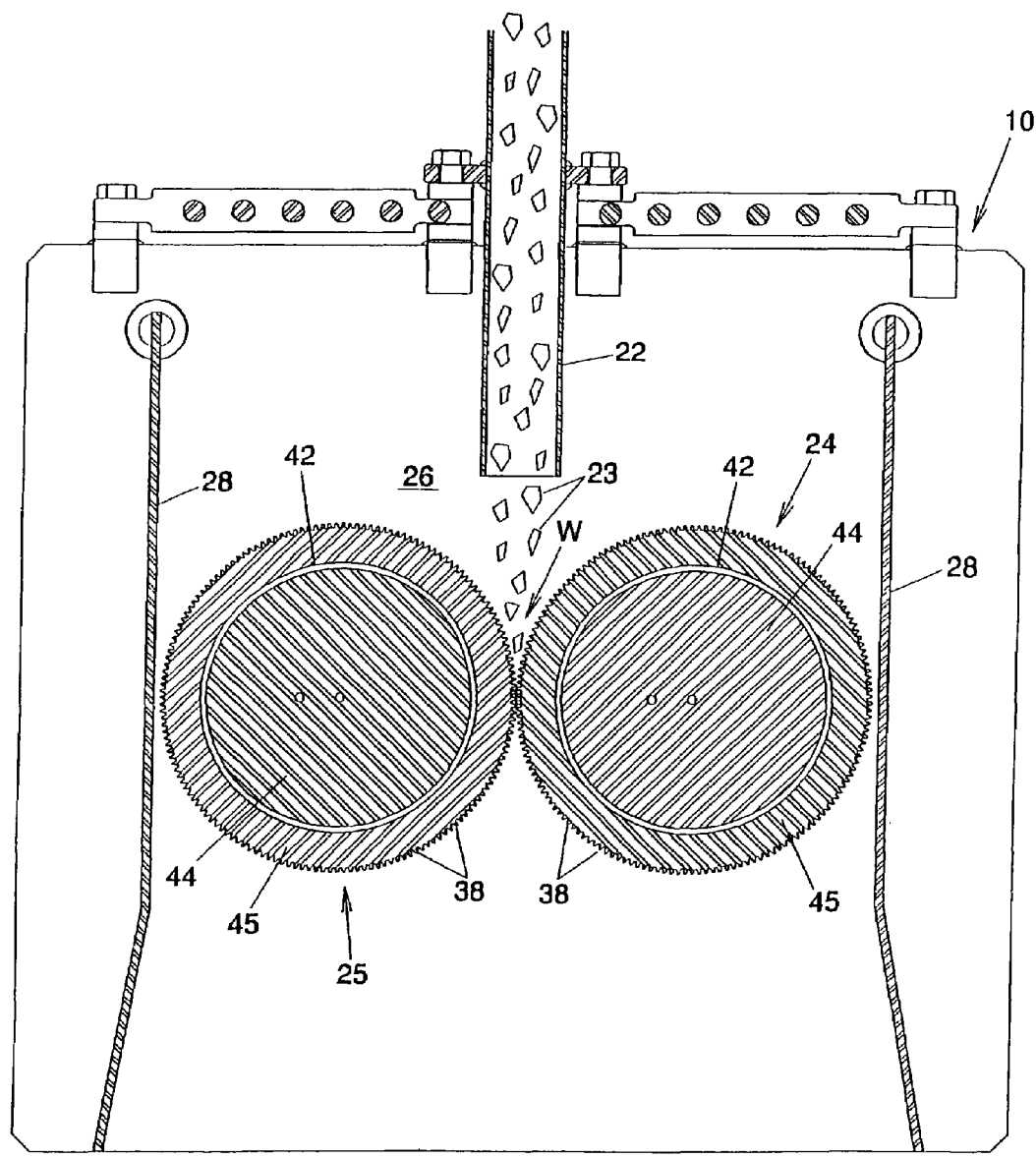
FIG. 3 is a partial transverse section view taken along line 3—3 in FIG. 2.

One preferred manipulating apparatus 10 is shown in FIGS. 2 and 3. Manipulating apparatus 10 includes a chute 22 through which workpieces 23 drop from the transport device 14 shown in FIG. 1. The illustrated manipulating apparatus 10 includes two spaced apart rollers 24 and 25 within a chamber 26. Rollers 24 and 25 are positioned within chamber 26 with their longitudinal axes extending substantially parallel to each other. Chamber walls 28 are positioned on either side of the two rollers. Rollers 24 and 25 are spaced apart with a minimum clearance between the roller surfaces which is less than an initial thickness of the workpieces 23. For example, workpieces 23 may be approximately 0.25 to 0.125 inches thick and the clearance between the opposing surfaces of rollers 24 and 25 may be approximately 0.10 inches. The spaced apart rollers 24 and 25 define a working area W extending from the point of minimum clearance between the roller surfaces upwardly to a point at which workpieces 23 first make contact with both rollers.

At least one of the rollers 24 or 25 is driven by a suitable drive motor so as to rotate about its longitudinal axis. The direction of rotation is toward the opposing roller. In the illustrated form of the invention, both rollers 24 and 25 are driven by a single drive motor 30 in a counter rotating fashion toward each other. Drive motor 30 drives first roller 24 directly through shaft 32 and timing gears 34 and 35 cooperate to drive the second roller 25. Timing gear 34 is mounted on drive shaft 32 while timing gear 35 is mounted on drive shaft 33 which is rigidly connected to second roller 25. Although not shown in the drawings, those skilled in the art will appreciate that drive motor 30 includes a suitable transmission arrangement for transmitting power to the first drive shaft 32. The drive motor 30 and associated transmission arrangement may be adapted for driving rollers 24 and 25 at a constant speed, or may be adapted to vary the speed to suit different processing rates.

Although rollers 24 and 25 may have a substantially smooth outer surface, the illustrated preferred rollers include longitudinally extending ridges 38. Rollers 24 and 25 are rotated in synchronization through the timing gears 34 and 35 so that each ridge 38 on one roller registers between adjacent ridges on the opposing roller similarly to the cogs of two intermeshed gears. However, the ridges 38 on the opposing rollers preferably do not touch, but always maintain a minimum clearance between the opposing roller surfaces, for example approximately 0.10 inches.

The manipulating apparatus 10 shown in FIGS. 2 and 3 also preferably includes a manipulator temperature control system for cooling or warming the outer surfaces of rollers 24 and 25, that is, the surfaces of the manipulating apparatus (machine surfaces) which may come in contact with workpieces 23. Maintaining the outer surface of rollers 24 and 25 at a temperature near the process temperature prevents the rollers from heating workpieces 23 above the process temperature as the workpieces come in contact with the roller surfaces. A roller outer surface temperature which is near but just above the particular process temperature being employed also helps prevent workpieces 23 from sticking to the rollers 24 and 25 and may also enhance microbe kill as discussed below. For example, the outer surfaces of the rollers 24 and 25 may be maintained at approximately 32 degrees Fahrenheit where the process temperature is approximately 28 degrees Fahrenheit or lower.

The illustrated temperature control system includes for each roller 24 and 25 an inlet 40 and an outlet 41. A channel 42 extends near the outer surface of the respective roller and is preferably formed as a continuous spiral groove between an inner roller member 44 and an outer roller member 45. A temperature controlling fluid is circulated through an inlet duct 48 associated with respective roller drive shaft 32 and 33 into the inlet 40, through the continuous spiral channel 42, and out through outlet port 41 and outlet duct 49 formed in respective drive shaft. Any suitable fluid may be circulated through the temperature control system for cooling or heating the outer surfaces of rollers 24 and 25 preferably to a temperature near the processing temperature, that is, the temperature of the frozen workpieces as they pass between the rollers. The system for producing the temperature control fluid, directing the fluid into inlet duct 48, and receiving the returning fluid from outlet duct 49 is omitted from the drawings so as not to obscure the invention in unnecessary detail. Such system is within the knowledge of those skilled in the art.

The roller-type manipulating apparatus 10 shown in FIGS. 2 and 3 also preferably includes gas injection ports 52. Any suitable gas such as clean air may be injected through the gas injection ports 52 so as to flow over the outer surfaces of rollers 24 and 25. The injected gas helps clean the roller surfaces and separate foodstuff material which may partially stick to the roller surfaces.

Figure 5:
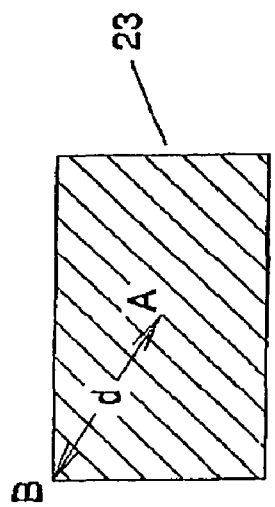
FIG. 5 is a view in section taken along line 5—5 in FIG. 4.
Figure 6:
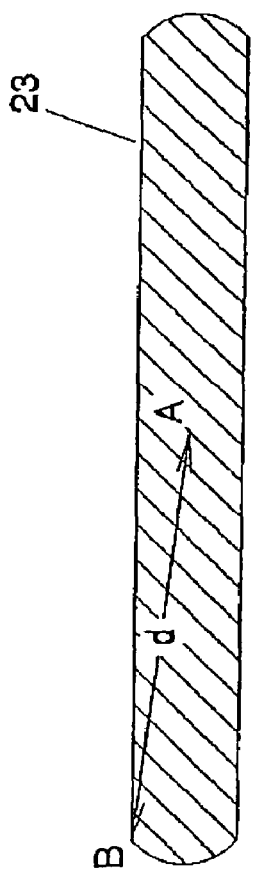
FIG. 6 is a view in section taken along line 6—6 in FIG. 4.
Figure 4:
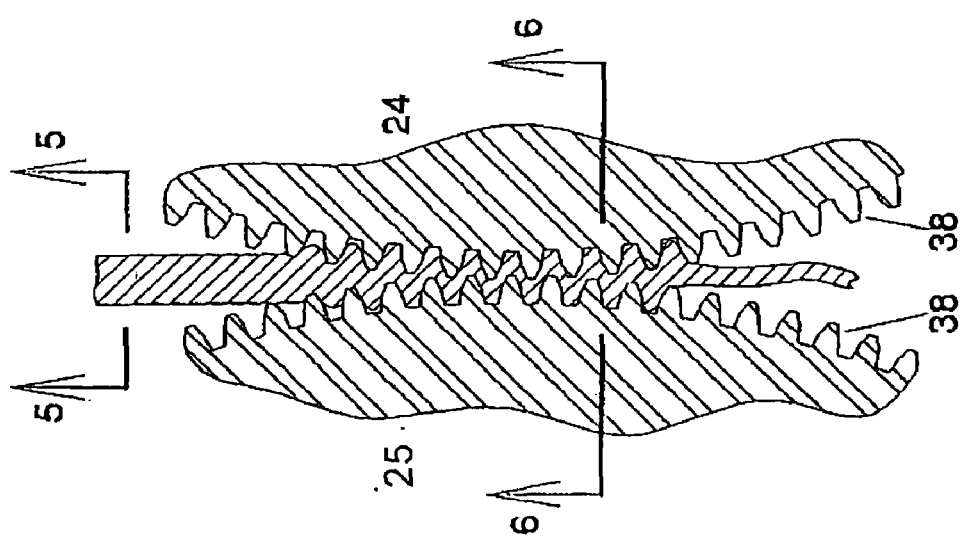
FIG. 4 is an enlarged diagrammatic side view of a piece of foodstuff being drawn between the rollers of a preferred manipulating arrangement.

In operation, the roller-type manipulating apparatus 10 shown in FIGS. 2 and 3 receives a plurality of workpieces 23 into chamber 26 immediately above rollers 24 and 25. As at least one of the rollers is rotated toward the opposite roller or both rollers are rotated toward each other in counter rotating fashion, workpieces 23 are drawn into the working area W and through the area of minimum clearance between the rollers. This action in shown best in FIGS. 4 through 6. Referring to FIGS. 4 and 5 each frozen workpiece retains generally its initial shape before passing into the working area between rollers 24 and 25. However, as shown in FIG. 6, the workpiece material is forced to spread out laterally as the workpiece passes through the working area W and ultimately through the area of minimum clearance between rollers 24 and 25. This spreading of the workpiece material causes relative movement between points within the volume of the material. For example, referring to FIG. 5, a central point A in workpiece 23 resides a distance d to a point B at one corner of the workpiece. However, as the workpiece 23 spreads out as it passes between rollers 24 and 25 as shown in FIG. 6, the distance d between point A and point B changes significantly. This relative movement would occur even if rollers 24 and 25 each had a smooth outer surface. The ridged rollers 24 and 25 have the added advantage of forcing the workpiece material to bend around the opposing ridges 38. This bending in the workpiece material produces additional relative movement between various points within the material.

In the preferred form of the invention, the manipulating arrangement causes relative movement throughout the volume of the foodstuff being processed. Relative movement throughout the foodstuff ensures consistent microbe kill throughout the foodstuff. However, manipulation which produces relative movement in only a portion of the material being processed produces microbe kill in that portion of the material in which the relative movement occurs. Significant microbe kill can be accomplished according to the invention by manipulating the frozen comminuted foodstuff so as to produce relative movement in at least approximately twenty percent of the volume of the foodstuff. In the roller-type manipulating arrangement disclosed in FIGS. 1 through 6, the extent of relative movement in the workpieces is controlled primarily by the clearance between the rollers relative to the initial thickness of the workpieces. A clearance between rollers equal to ninety-five percent (95%) or less of the total initial thickness of the individual workpieces produces the desired relative movement in a significant volume of the foodstuffs being processed.

Figure 7:
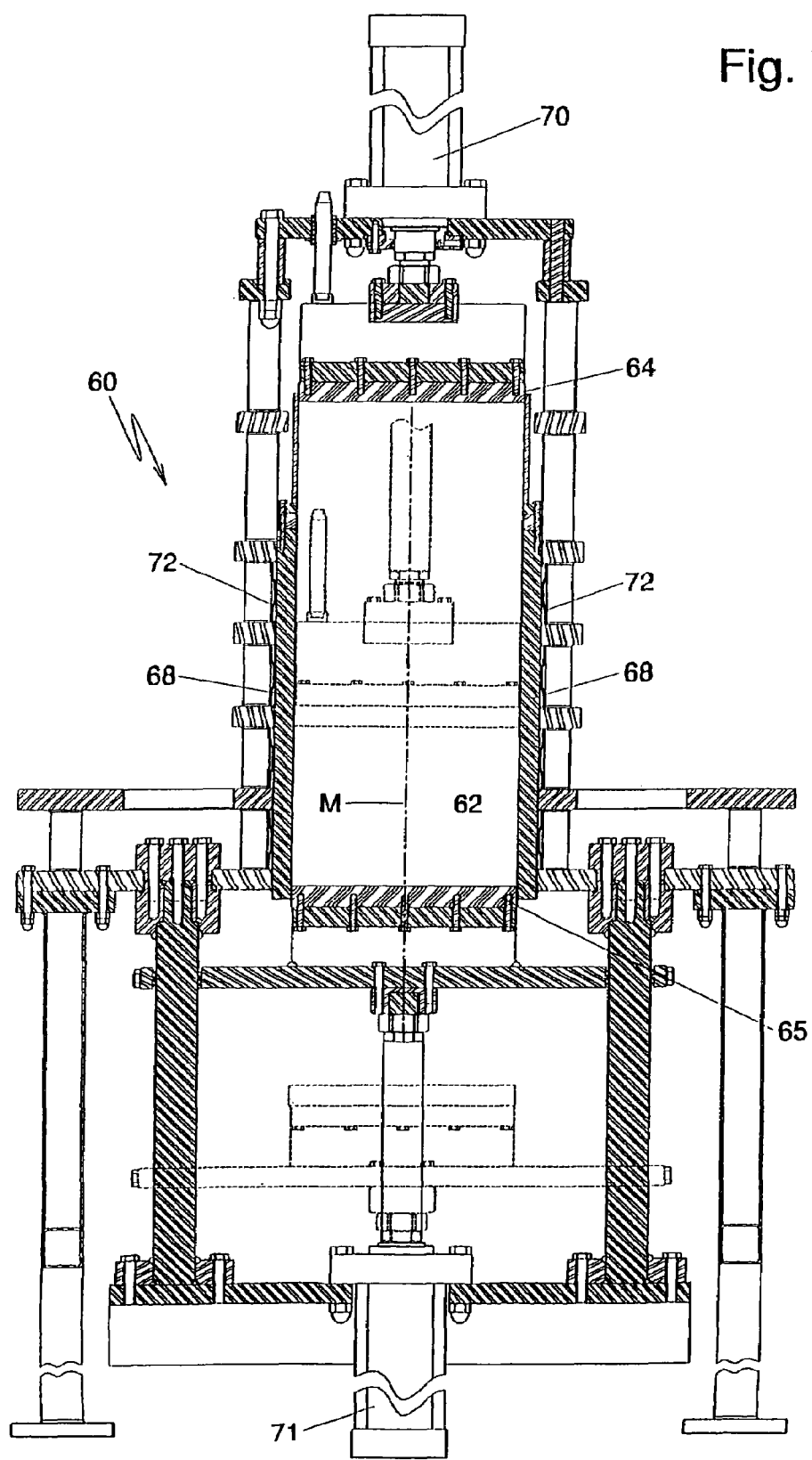
FIG. 7 is a partial section view showing an alternate manipulating arrangement embodying the principles of the invention.

FIG. 7 shows an alternate manipulating arrangement 60 according to the invention. In the form of invention shown in FIG. 7, workpieces (not shown in FIG. 7) are collected in an area 62 bounded by at least one movable plate. The form of invention shown FIG. 7 has both a movable top plate or platen 64 and a movable bottom plate or platen 65. Both top plate 64 and bottom plate 65 are movable along axis M relative to chamber walls 68. A top actuator 70 is associated with top plate 64 while a bottom actuator 71 is associated with bottom plate 65. Actuator 70 may comprise a suitable hydraulic or pneumatic piston and cylinder unit for positioning the top plate 64 along the axis M. Actuator 71 may similarly comprise a piston and cylinder arrangement for positioning bottom plate 65 along axis M. Chamber walls 68 may each have a structure 72 which allows a temperature control fluid to be circulated there through for cooling or heating the chamber walls to a temperature near the process temperature similarly to the rollers 24 and 25 discussed above with particular reference to FIGS. 2 and 3.

In operation, numerous small workpieces (not shown in FIG. 7) are randomly arranged in the area 62 defined by bottom plate 65 and chamber walls 68. The random arrangement of rigid small workpieces in the area 62 leaves numerous voids between the individual workpieces. Once the area is filled to a desired point, top actuator 70 is operated to move the top plate downwardly toward bottom plate 65 and into the area 62 defined between the chamber walls 68. A lowered position of top plate 64 is shown in phantom in FIG. 7. As top plate 64 advances toward bottom plate 65, the workpieces deform to fill the voids in the volume. This deformation produces relative movement throughout each workpiece.

Top plate 64 may be advanced downwardly until the individual workpieces (not shown in FIG. 7) in area 62 deform to produce substantially a solid block of material. At is point, bottom actuator 71 may be operated to move bottom plate 65 downwardly along axis M as top plate 64 continues downwardly. This downward movement of both top plate 64 and bottom plate 65 pushes the block formed from the frozen workpieces out from between chamber walls 68. Once the block clears chamber walls 68, the block of frozen material may be transferred by suitable means to another location for packaging for further processing.

Manipulating apparatus 60 shown in FIG. 7 is used in connection with a freezer and a transport device which are not shown in the drawing. The freezer may be the same type of freezer discussed with reference to FIG. 1. The transport device may be any suitable conveyor or other device for transporting the frozen, pH modified workpieces from the freezer to the chamber area 62. The freezer preferably freezes the workpieces in less than 30 minutes and optimally in less than 10 minutes. Relatively small workpieces are preferable for use in the manipulating arrangement shown in FIG. 7. Workpieces having a size on the order of 0.5 inches by 0.5 inches by 0.25 inches ensure consistent relative movement within each workpiece. However larger or smaller thin pieces of frozen comminuted or ground foodstuffs may be effectively treated with the apparatus 60 shown in FIG. 7.

The manipulating process according to the invention is particularly applicable to comminuted foodstuffs. As used in this disclosure and in the following claims, a comminuted foodstuff may comprise any ground, chopped, or mixed foodstuff which is made up of relatively small pieces of foodstuffs which have been cut down or otherwise formed from larger pieces. The invention is well suited for treating ground meat such as beef, pork, or poultry. In the following examples, the process was applied to comminuted beef products. However, the invention may be used to treat substantially any comminuted foodstuff.

The manipulation according to the invention provides an immediate reduction in microbe count. However, microbe count decreases further for a period of time after the manipulation is performed. It is therefore preferable to use the processed foodstuffs no sooner than approximately 24 hours after the manipulation is performed. In this sense "use" the foodstuffs means cook the product or incorporate it into another food product.

Regardless of the particular manipulation arrangement used, it may be desirable to cause at least a portion of each workpiece to go to an unfrozen state during the physical manipulation step. As used in this disclosure and the following claims, an "unfrozen" state means a state in which some, but not necessarily all, ice crystals formed in the foodstuff when the foodstuff was cooled to the process temperature go back to a liquid state. Placing a portion of each workpiece in an unfrozen state may be accomplished by the pressure applied in the manipulation step or may be accomplished by increasing the temperature of a portion of each workpiece during the manipulation step to the freezing point of the foodstuff or slightly above the freezing point. After physically manipulating or stressing the workpieces, each workpiece is re-frozen to the process temperature, that is, a temperature no greater than or below the freezing point of the foodstuff. The workpieces may be re-frozen by cooling them in a suitable freezing device or by allowing the still frozen portions of the workpieces to re-freeze the adjacent unfrozen portions. Also, re-freezing may be accomplished in some cases simply by removing the pressure applied during the manipulation step.

EXAMPLE I

A test was performed using a block-type manipulation apparatus similar to that illustrated in FIG. 7. Two batches of foodstuffs were processed in the apparatus. A first batch comprised regular ground beef having a pH of approximately 5.25 to 5.5. A second batch was made up of ground beef mixed with 15% (by weight) lean finely textured beef having a pH of approximately 6.25 to 6.5. The ground beef used in the second batch was taken from the same lot as the ground beef used in the first batch. It will be noted that the pH increase in the second batch was accomplished by mixing the higher pH lean finely texture beef with the lower pH ground beef.

The first batch comprising regular ground beef was first processed through a grinder having 0.125 inch diameter grinder plate openings. Five samples of the ground beef material were taken at the grinder output, the samples taken approximately 10 seconds apart. The ground beef was then cooled to approximately 28 degrees Fahrenheit (a temperature below the freezing point of the ground beef material) in about two minutes using a roller-type freezing machine described above. The frozen ground beef was cut into workpieces with a cutting machine associated with the roller-type freezer, the workpieces being about one-eighth inch thick and measuring approximately one-half inch by one-half inch. Five samples were taken at the output of the freezer/cutter arrangement.

The workpieces of ground beef at the process temperature were then placed in a block-type manipulating device similar to that shown in FIG. 7. The working area of the device was filled loosely with the workpieces and then the volume of the loose collection of workpieces was reduced by about 50% to form a block of frozen ground beef. The volume reduction was achieved by advancing a top plate. The block of material was then removed from the manipulating device and samples of material were cored at various locations around the block. These cores were mixed together and five samples of frozen material were then collected from the mix of cored material.

Tables 1 through 3 show the results of bacteria tests performed on the various samples described above. Tests were conducted for Total Plate count (TPC), *E.Coli* count, Coliform count, and Staph count. Tests were also conducted to detect the presence of *Salmonella* and *Listeria*. Table 1 shows the results for the five samples taken at the grinder output. Table 2 shows the results for the five samples taken at the freezer/cutter output. Table 3 shows the bacteria test results for the five samples taken from the material removed from the frozen block. Comparing Table 3 to Tables 1 and 2, the freezing and manipulation alone produced a reduction in Coliform and Staph counts in the ground beef.

TABLE 1

| Sample | TPC | *E. Coli* | Coliform | Staph | Sal. | List |
|---|---|---|---|---|---|---|
| 1 | 7,800 | 20 | 150 | 43 | Neg | Neg |
| 2 | 6,000 | 40 | 130 | 23 | Neg | Pos |
| 3 | 13,000 | 10 | 720 | 7 | Neg | Neg |
| 4 | 4,600 | 30 | 490 | 9 | Pos | Neg |
| 5 | 4,700 | 90 | 910 | 43 | Neg | Pos |
| Avg | 7,220 | 38 | 480 | 25 | N/A | N/A |

TABLE 2

| Sample | TPC | *E. Coli* | Coliform | Staph | Sal. | List |
|---|---|---|---|---|---|---|
| 1 | 20,000 | 10 | 250 | 23 | Pos | Neg |
| 2 | 9,200 | 40 | 490 | 4 | Neg | Pos |
| 3 | 16,000 | 10 | 720 | 9 | Neg | Neg |
| 4 | 5,100 | 10 | 130 | 7 | Neg | Neg |
| 5 | 6,900 | 20 | 680 | 23 | Neg | Neg |
| Avg | 11,440 | 18 | 454 | 13.2 | N/A | N/A |

TABLE 3

| Sample | TPC | E. Coli | Coliform | Staph | Sal. | List |
|---|---|---|---|---|---|---|
| 1 | 7,600 | 10 | 110 | 9 | Neg | Neg |
| 2 | 5,900 | 20 | 200 | 3 | Neg | Neg |
| 3 | 6,100 | 10 | 270 | 3 | Neg | Pos |
| 4 | 750 | 10 | 210 | 9 | Neg | Neg |
| 5 | 6,700 | 20 | 400 | 3 | Neg | Neg |
| Avg | 5,410 | 14 | 238 | 5.4 | N/A | N/A |

The second batch of beef material, comprising the ground beef mixed with 15% lean finely textured beef, was processed in the same fashion as the first batch and samples were taken in the same fashion and at the same points. Tables 4 through 6 show the results of bacteria tests performed on the samples from the second batch. Table 4 shows the results for the five samples taken at the grinder output. Table 5 shows the results for the five samples taken at the freezer/cutter output. Table 6 shows the bacteria test results for the five samples taken from the material removed from the frozen block. Comparing the Table 6 test results with those of Tables 4 and 5, there was a marked reduction in Total Plate count, *E. Coli* count, Coliform count, and Staph count in the samples taken after pH manipulation and manipulation in the block-type manipulation device. The "<" symbol in Table 6 indicates that the observed count was less than the minimum resolution for the test. Also, all tests for *Salmonella* and *Listeria* were negative in the material subjected to both pH manipulation and physical manipulation according to the invention.

TABLE 4

| Sample | TPC | E. Coli | Coliform | Staph | Sal. | List |
|---|---|---|---|---|---|---|
| 1 | 29,000 | 90 | 720 | 7 | Neg | Neg |
| 2 | 8,600 | 40 | 490 | 4 | Pos | Neg |
| 3 | 13,000 | 180 | 270 | 43 | Pos | Neg |
| 4 | 4,600 | 220 | 1,600 | 23 | Neg | Pos |
| 5 | 6,000 | 110 | 200 | 23 | Neg | Pos |
| Avg | 12,240 | 128 | 656 | 20 | N/A | N/A |

TABLE 5

| Sample | TPC | E. Coli | Coliform | Staph | Sal. | List |
|---|---|---|---|---|---|---|
| 1 | 5,800 | 10 | 110 | 9 | Neg | Neg |
| 2 | 3,400 | 40 | 200 | 4 | Neg | Pos |
| 3 | 3,900 | 10 | 270 | 7 | Neg | Neg |
| 4 | 3,100 | 10 | 210 | 4 | Neg | Neg |
| 5 | 5,300 | 20 | 400 | 9.1 | Neg | Neg |
| Avg | 4,300 | 18 | 238 | 6.6 | N/A | N/A |

TABLE 6

| Sample | TPC | E. Coli | Coliform | Staph | Sal. | List |
|---|---|---|---|---|---|---|
| 1 | 2,900 | <10 | 10 | <3 | Neg | Neg |
| 2 | 2,700 | <10 | <10 | <3 | Neg | Neg |
| 3 | 2,000 | <10 | 10 | <3 | Neg | Neg |
| 4 | 300 | <10 | <10 | <3 | Neg | Neg |
| 5 | 900 | <10 | 10 | <3 | Neg | Neg |
| Avg | 1,760 | <10 |  | <3 | N/A | N/A |

The above described preferred embodiments are intended to illustrate the principles of the invention, but not to limit the scope of the invention. Various other embodiments and modifications to these preferred embodiments may be made by those skilled in the art without departing from the scope of the following claims. For example, a screw press or compressor may be used as the manipulating device in place of the block forming arrangement shown in FIG. 8 or roller-type manipulating device shown in FIGS. 2 and 3. Also, although the invention is described as processing individual workpieces formed from the foodstuff to be treated, the roller-type treatment apparatus such as that shown in FIGS. 2 and 3 may operate on a substantially continuous strand or strands of frozen foodstuff. Each such strand is to be considered an equivalent of the workpieces described above and set out in the following claims.

The invention claimed is:

1. A process including the steps of:
   (a) reducing the temperature of a pH modified foodstuff to a temperature below the freezing point of the pH modified foodstuff; and
   (b) physically manipulating the pH modified foodstuff to produce relative movement between points throughout a portion of the pH modified foodstuff while that portion is at the temperature below the freezing point of the pH modified foodstuff.

2. The process of claim 1 further including the step of modifying the pH of a comminuted foodstuff to produce the pH modified foodstuff.

3. The process of claim 2 wherein the step of modifying the pH of the comminuted foodstuff to produce the pH modified foodstuff comprises placing the comminuted foodstuff in contact with $NH_3$ gas.

4. The process of claim 2 wherein the step of modifying the pH of the comminuted foodstuff to produce the pH modified foodstuff comprises placing the comminuted foodstuff in contact with a solution of $NH_3$ in water.

5. The process of claim 2 wherein the step of modifying the pH of the comminuted foodstuff to produce the pH modified foodstuff comprises reducing the fat content of the comminuted foodstuff.

6. The process of claim 1 further including the step of forming the pH modified foodstuff into at least one workpiece prior to the step of producing relative movement between points throughout the portion of the pH modified foodstuff.

7. A process including:
   (a) receiving at a physical manipulating apparatus, a pH modified foodstuff at a temperature below the freezing point of the pH modified foodstuff; and
   (b) physically manipulating the pH modified foodstuff to produce relative movement between points substantially throughout the pH modified foodstuff while the pH modified foodstuff is at a respective temperature below the freezing point of the pH modified foodstuff.

8. The process of claim 7 further including the step of placing an initial foodstuff in contact with a pH increasing material to produce the pH modified foodstuff.

9. The process of claim 8 wherein the pH increasing material includes $NH_3$ gas.

10. The process of claim 8 wherein the pH increasing material includes ammonia in solution with water.

11. The process of claim 7 wherein physically manipulating the pH modified foodstuff includes passing the pH modified foodstuff between two rollers spaced apart a distance less than a thickness of the pH modified foodstuff.

12. The process of claim 7 wherein the step of physically manipulating the pH modified foodstuff includes compressing the pH modified foodstuff between two plates.

13. The process of claim 12 further including pressing the pH modified foodstuff into a substantially solid block of frozen material.

14. A process including:
    (a) receiving at a physical manipulating apparatus, a pH modified foodstuff at a temperature below the freezing point of the pH modified foodstuff; and
    (b) physically manipulating the pH modified foodstuff to produce relative movement between points throughout a portion of the pH modified foodstuff while that portion is at the temperature below the freezing point of the pH modified foodstuff.

15. The process of claim 14 further including the step of placing an initial foodstuff in contact with a pH increasing material to produce the pH modified foodstuff.

16. The process of claim 15 wherein the pH increasing material includes $NH_3$ gas.

17. The process of claim 15 wherein the pH increasing material includes ammonia in solution with water.

18. The process of claim 14 wherein physically manipulating the pH modified foodstuff includes passing the pH modified foodstuff between two rollers spaced apart a distance less than a thickness of the pH modified foodstuff.

19. The process of claim 14 wherein of physically manipulating the pH modified foodstuff includes compressing the pH modified foodstuff between two plates.

20. The process of claim 19 further including pressing the pH modified foodstuff into a substantially solid block of frozen material.

* * * * *

UNITED STATES PATENT AND TRADEMARK OFFICE
CERTIFICATE OF CORRECTION

| | | |
|---|---|---|
| PATENT NO. | : 7,037,544 B2 | Page 1 of 1 |
| APPLICATION NO. | : 10/779,032 | |
| DATED | : May 2, 2006 | |
| INVENTOR(S) | : Eldon Roth | |

It is certified that error appears in the above-identified patent and that said Letters Patent is hereby corrected as shown below:

At column 12, line 46:
Change "(a) receiving at a physical manipulating apparatus," to --(a) receiving, at a physical manipulating apparatus,--.

At column 13, line 5:
Change "(a) receiving at a physical manipulating apparatus," to --(a) receiving, at a physical manipulating apparatus,--.

Signed and Sealed this

Eighteenth Day of July, 2006

JON W. DUDAS
*Director of the United States Patent and Trademark Office*